United States Patent [19]

Kanda

[11] Patent Number: 5,206,740

[45] Date of Patent: Apr. 27, 1993

[54] VIDEO DISK PLAYER CAPABLE OF PROVIDING NORMAL IMAGE REPRODUCTION OF AN EXTERNAL VIDEO SIGNAL AS WELL AS A VIDEO SIGNAL STORED ON A DISK

[75] Inventor: Masao Kanda, Tokorozawa, Japan

[73] Assignee: Pioneer Electronic Corporation, Tokyo, Japan

[21] Appl. No.: 631,419

[22] Filed: Dec. 21, 1990

[30] Foreign Application Priority Data

May 28, 1990 [JP] Japan ................................ 2-137629

[51] Int. Cl.[5] ............................................. H04N 5/76
[52] U.S. Cl. .................................... 358/342; 358/335; 358/907
[58] Field of Search ............... 358/342, 335, 310, 312, 358/321, 322, 324, 338, 339, 907; 360/51, 10.1, 72.03, 77.02, 78.04–78.14; 369/48, 50, 59

[56] References Cited

U.S. PATENT DOCUMENTS

| 4,603,412 | 7/1986 | Yamazaki | 358/342 |
| 4,609,948 | 9/1986 | Okano | 358/342 |
| 4,757,488 | 7/1988 | Nagai et al. | 369/111 |
| 4,845,572 | 7/1989 | Yasuda | 358/342 |
| 4,959,825 | 9/1990 | Okano | 358/339 |
| 4,962,494 | 10/1990 | Kimura | 358/342 |

Primary Examiner—Tommy P. Chin
Assistant Examiner—Thai Tran
Attorney, Agent, or Firm—Keck, Mahin & Cate

[57] ABSTRACT

A video disk player generates an error control signal according to the difference between write and read addresses, and causes a read clock to be synchronized in phase with a write clock, on the basis of the error control signal upon reception of an external video signal instead of a video signal produced by playing a video disk, thereby always keeping constant the difference between both addresses.

4 Claims, 4 Drawing Sheets

VIDEO DISK PLAYER CAPABLE OF PROVIDING NORMAL IMAGE REPRODUCTION OF AN EXTERNAL VIDEO SIGNAL AS WELL AS A VIDEO SIGNAL STORED ON A DISK

BACKGROUND OF THE INVENTION

1. Field of the Invention

The present invention relates to a video disk player and, more particularly, to a video disk player equipped with a time axis correcting device using a memory.

2. Description of the Related Art

FIG. 1 illustrates a conventional video disk player equipped with a time axis correcting device using a memory. Referring to FIG. 1, a reproduction video signal including a time-axis varying component, read out from a video disk and demodulated, is sent to a write controller where it is quantized with a write clock WCK, which is generated in phase synchronism with this video signal. The quantized signal is sequentially written into a line memory 8 by a write clock WCK at a write address which is initialized by a write start signal RSTW. A read start signal RSTR for reading out data from the line memory 8 and a read clock RCK are prepared by a controller 9 on the basis of a fixed reference clock generated from a crystal oscillator or the like.

An error generator 10 produces an error signal corresponding to a constant difference between the write address and read address on the basis of the write start signal RSTW and read start signal RSTR; this error signal serves as a drive signal for a spindle driver 11. Accordingly, the speed of the spindle motor 2 is controlled so that the difference between the write address and read address is always constant. As a result, the average frequency of the write clock WCK becomes equal to that of the read clock RCK.

As described above, data writing to the line memory 8 is executed using the write clock WCK acquired in phase synchronism with the reproduction video signal, and data reading from the memory 8 is done using the read clock RCK generated on the basis of the fixed reference clock. This can eliminate the time-axis varying component contained in the reproduction video signal, thus providing a video output free from the time-axial variation. Further, the spindle servo is activated to make the difference between the write and read addresses always constant so that the relation between the write and read timings is always kept unchanged, yielding a correct reproduction image.

A field memory 12 is provided at the subsequent stage of the line memory 8 for temporary storage of digital data from the line memory 8. To properly control the write and read timings for the field memory 12 can provide various types of special reproduction modes, such as still picture reproduction, strobe reproduction and multi screening. Furthermore, it is possible to perform a digital Y-C separating function or a digital noise reducing function.

Since, on the other hands, the field memory is expensive, typical TV receivers are not generally equipped with such a memory and do not attain the above-mentioned special reproduction effects on modes as a consequence. Thus, an attempt can be made so as to exploit a memory of a video disc player by introducing thereto a TV video signal or the like as an external video signal. Further, it is possible to attain Y and C components separation from the TV video signal or attain noise elimination by using the particular memory for the digital Y-C separating function or the digital noise reduction function.

If the conventional video disk player is modified to be able to selectively relay an external video signal to an A/D converter 5 and a sync separator 6, the write clock WCK acquired in phase synchronism with the video signal becomes substantially a fixed clock since this external video signal contains no time-axis varying component. As there exists an error in accuracy of the crystal oscillation between the write clock WCK and read clock RCK, the difference between the write address and read address gradually decreases or increases. If the input video signal to the line memory 8 is attained from the video disk 1, the write clock WCK can be controlled by the spindle servo, as described earlier. This control cannot however be executed to the external video signal. It is not therefore possible to maintain the difference between the write and read addresses of the line memory 8 constant, adjustments between write and read addresses are needed which are likely to cause double reading of the same data from the memory a blank state in which no data is readable from a certain area of the memory. It is desirable that the timings of the write start signal RSTW and read start signal RSTR, which respectively initialize the write and read addresses, have the relation shown in FIG. 2A such that the signal RSTR is generated at approximately the middle of the RSTW-generating duration. If the RSTR-generating duration becomes narrower as shown in FIG. 2B so that the read start signal RSTR is generated again before generation of the next write start signal RSTW, however, data in the duration A would be read twice. If the RSTR-generating duration becomes wider as shown in FIG. 2C so that the read start signal RSTR is not generated in the RSTW-generating duration A, the data in the duration A cannot be read out.

If such phenomenon which would result in double reading of the same data or the blank state where no data in the duration A cannot be read out occurs, the normal image reproduction from the external video signal cannot be carried out because of the usage of a memory.

SUMMARY OF THE INVENTION

It is therefore an object of the present invention to provide a video disk player capable of presenting normal image reproduction of an external video signal while using a memory.

To achieve this object, according to the present invention, there is provided a video disk player with a memory into which a reproduction video signal acquired through demodulation of a signal read out from a video disk or an external video signal supplied is written in synchronism with a write clock and reading stored data from the memory in synchronism with a read clock, which video disk player comprises a means for generating the write clock in phase synchronism with the reproduction video signal or the external video signal; means for generating a control signal in accordance with a difference between write and read addresses of the memory; means for controlling a rotational speed of the video disk based on the control signal only at a time of processing the reproduction video signal; and means for generating the read clock on the basis of a fixed reference clock signal at the time of processing the reproduction video signal, and on the basis of the control signal at a time of processing the external video signal.

According to the video disk player embodying the present invention, a control signal according to the difference between the write and read addresses of a memory is generated, and at the time of processing a reproduction video signal, a read clock is generated on the basis of a fixed reference clock signal while the phase of a write clock is altered by spindle servo on the basis of the control signal, thereby keeping constant the difference between the write and read addresses. At the time of processing an external video signal, the read clock is synchronized in phase with the write clock on the basis of the control signal, thus maintaining constant the difference between the write and read addresses constant.

DETAILED DESCRIPTION OF THE PREFERRED EMBODIMENT

A preferred embodiment of the present invention will now be described in detail referring to the accompanying drawings.

Figure 1:
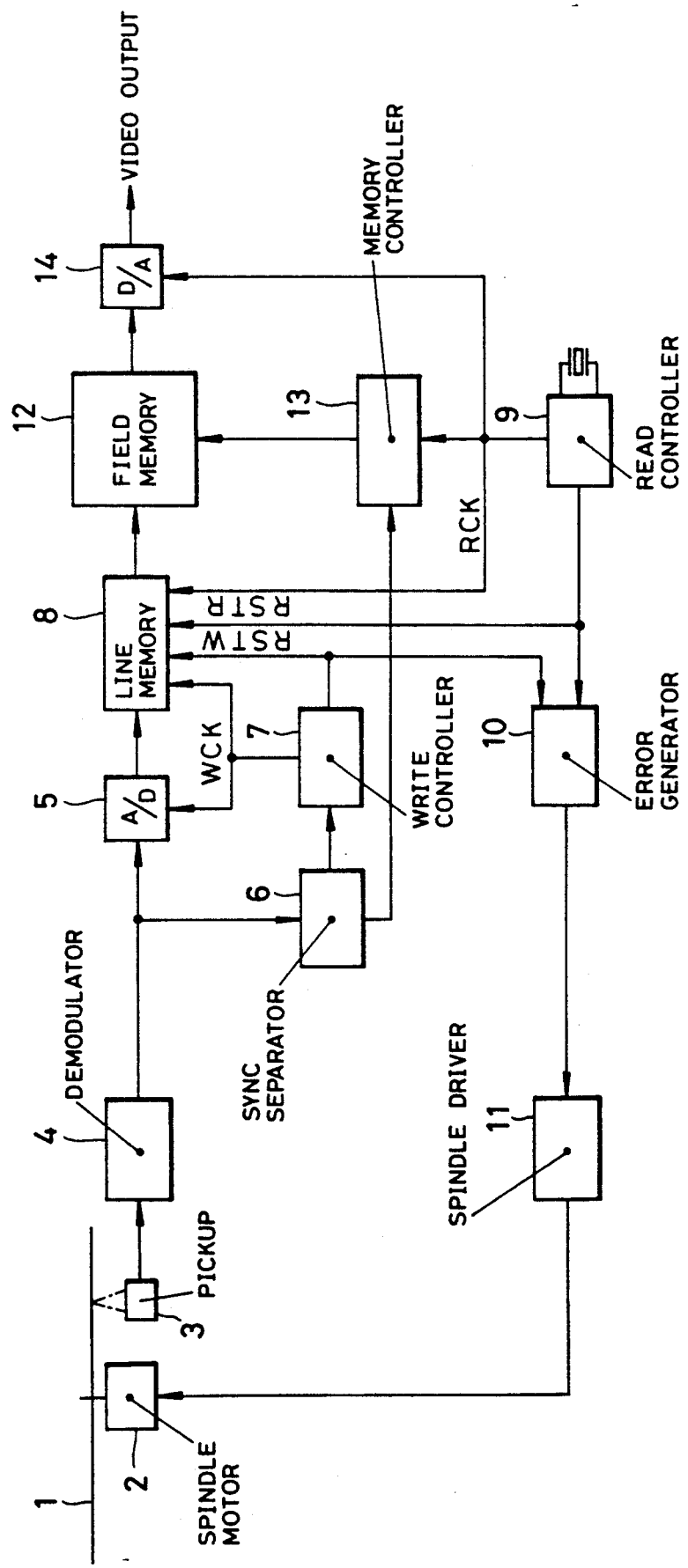
FIG. 1 is a block diagram illustrating a prior art.
Figure 2:
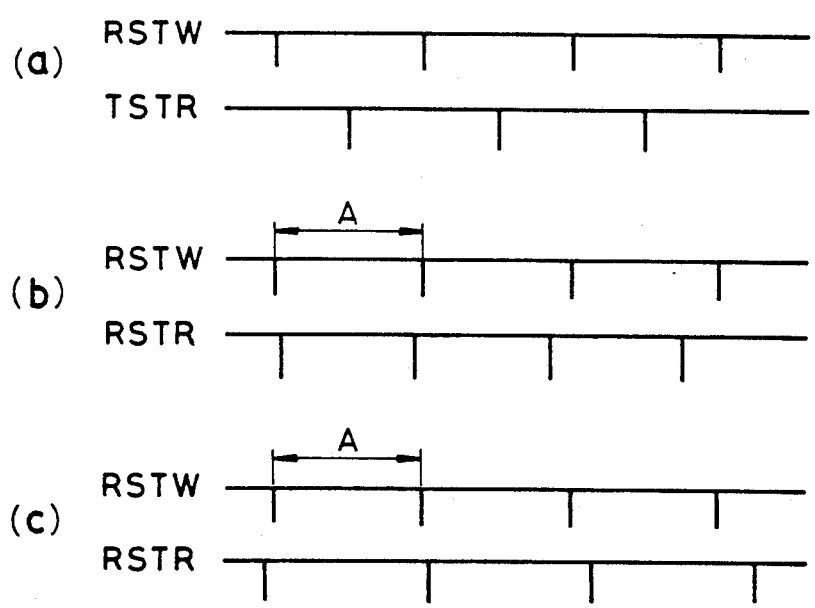
FIG. 2 is a diagram illustrating the relation between the timings of a write start signal RSTW and a read start signal RSTR.
Figure 3:
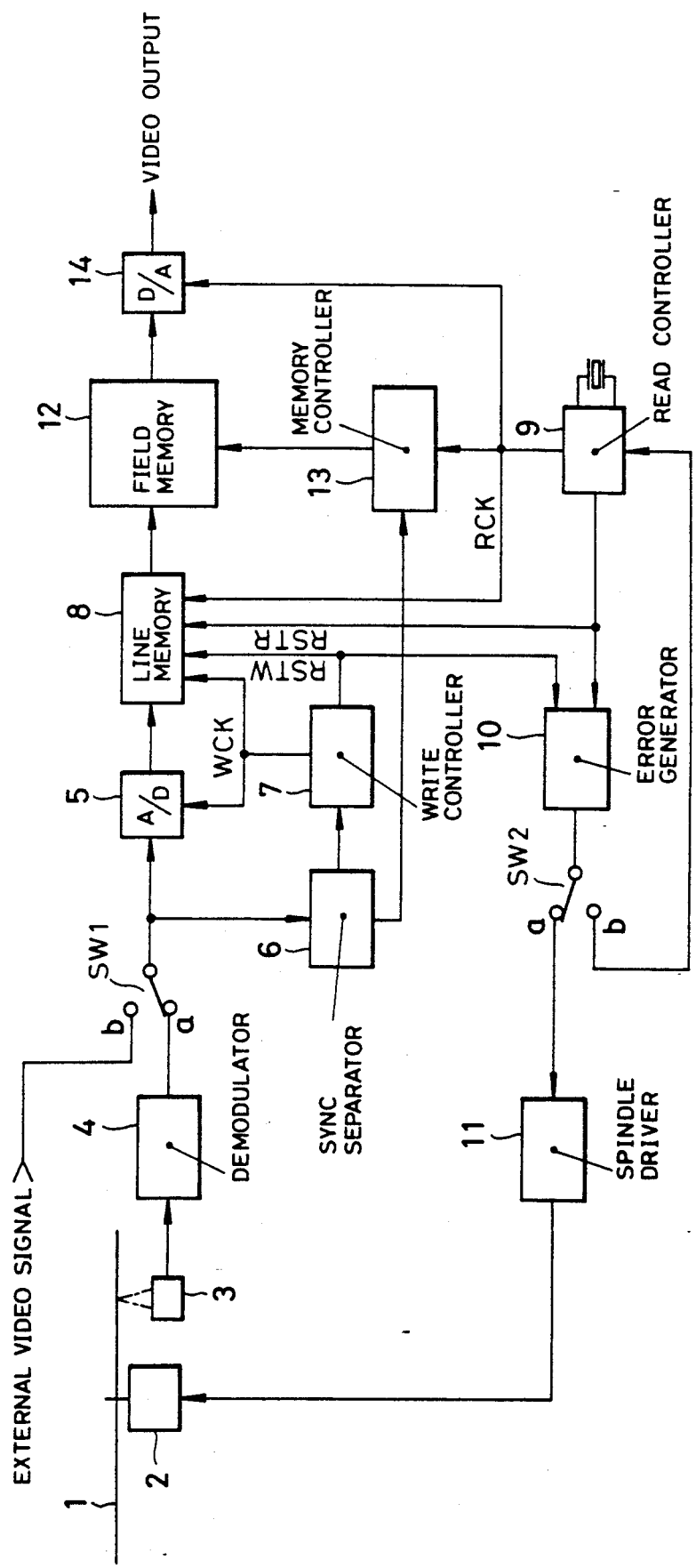
FIG. 3 is a block diagram showing one embodiment of the present invention.

Referring to FIG. 3, a video disk 1 is driven by a spindle motor 2 and data recorded on the video disk is read out by a pickup 3. The output of the pickup 3 is demodulated by a demodulator 4, and the demodulated signal is sent as a reproduction video signal to one input of a switch SW1. An external video signal, such as a TV video signal, is supplied as the other input of the switch SW1. Either the reproduction video signal or the external video signal is selected by the switch SW1, then supplied to an A/D converter 5 and a sync separator 6. The sync separator 6 separates a sync signal from the received reproduction video signal or external video signal and sends it to a write controller 7. The write controller 7 generates a write clock WCK synchronized with the received sync signal and generates a write start signal RSTW at a given timing of a video signal as shown in FIG. 2A.

Figure 4A:
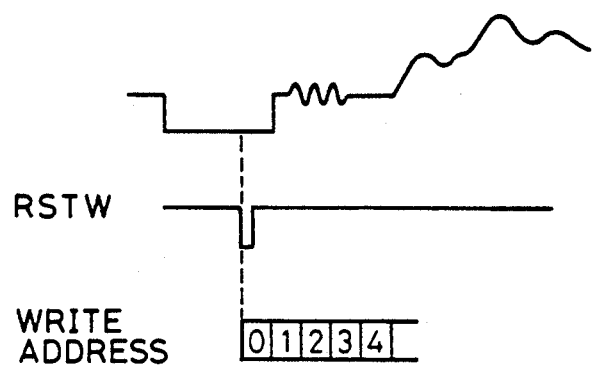
FIG. 4A is a diagram illustrating the relation between the write start signal RSTW to a video signal on the writing side and the timing of the write address to a memory.

Either the reproduced video signal or the external video signal selected by means of the switch SW1 is quantized to be digital video data in the A/D converter 5 using the above-mentioned write clock WCK as a reference clock. This digital video data is sequentially written at predetermined addresses in a line memory 8 having a memory capacity corresponding to one line of a video signal, for example. The write address of the line memory 8 is initialized by the write start signal RSTW as shown in FIG. 4A. In other words, generating the write start signal RSTW at a predetermined position of a video signal to be written can always keep the address of the line memory 8 for the video signal at the same location. Data reading from the line memory 8 is performed by a read controller 9.

The read controller 9, having a VCXO (Voltage Controlled X'tal (Crystal) Oscillator) whose oscillation frequency varies with a changing bias voltage, is designed in such a way that the frequency of a read clock RCK varies according to an error signal to be described later.

Figure 4B:
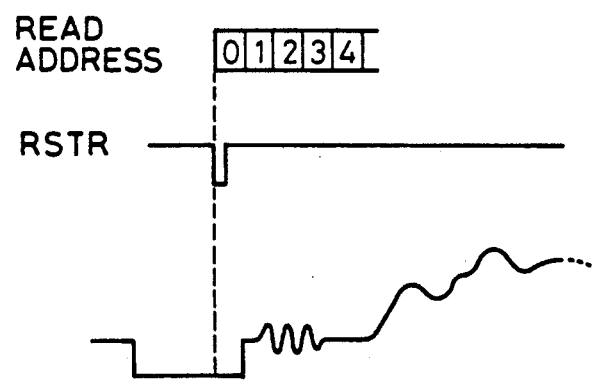
FIG. 4B is a diagram illustrating the relation between the read start signal RSTR to a video signal on the reading side and the timing of the read address to a memory.

The read address of the line memory 8 is initialized by a read start signal RSTR generated by the read controller 9, as shown in FIG. 4B, and the digital video data which has been written starting at the predetermined address is sequentially read out in synchronism with the read clock RCK.

The memory capacity of the line memory 8 is limited and is constituted by a FIFO (First In First Out) type memory for which the write clock and read clock can be formed a synchronously. It is typical that the difference between the write address and read address for this memory should be equal to or greater than a certain level. When the timing relation between the write start signal RSTW and the read start signal RSTR changes, the same data may be repeatedly read out or written data may not be read out, as described earlier. In this respect, therefore, it is necessary to control the difference between the write and read addresses to be constant.

According to the present invention, when the external video signal is selected, an error signal generated by an error generator 10 in correspondence to a constant difference between the write and read addresses on the line memory 8 is supplied to the read controller 9 thereby to alter the read clock RCK.

At the mode of processing the reproduced video signal, the spindle servo is effected by using the control signal generated by the error generator 10 as in the prior art, when, on the other hand, the external video signal is processed, the control signal is supplied to the read controller 9 to control the oscillation frequency of the VCXO so as to permit the read clock RCK to be synchronized in phase with the write clock WCK.

As the read clock RCK changes at this time, it may not seem possible to attain the proper time-axial correction effect. Since the error difference between the write clock WCK and read clock RCK is an accuracy of crystal oscillation, however, a jitter component if appearing on the screen is mostly negligible.

Digital video data read out from the line memory 8 is temporarily stored in a field memory 12 having a memory capacity corresponding to one screen. This field memory 12 is controlled by a memory controller 13; the write address of the memory 12 is determined on the basis of a sync signal from the sync separator 6. It should be understood that the read address of the field memory can be determined independently from the write address and data is continuously read out from the memory 12. The digital video data read out from the field memory 12 is converted into an analog video signal by a D/A converter 14. The field memory 12 is not essential, and a frame memory having a memory capacity corresponding to two screens may be used in place of the memory 12.

The following will discuss the individual operations at the time of processing a reproduction video signal originated from playing a video disk and at the time of processing an external video signal.

When it is intended to process a video signal read from a video disk, the switches SW1 and SW2 are both set at the a side. The read and reproduced video signal including a time-axial error component, which is acquired by demodulating a video signal read out from the video disk 1, is quantized with the write clock WCK generated in synchronism in phase with the video signal in the write controller 7. In response to the write clock WCK, the video signal is further sequentially written in the line memory 8 at the write address which has been initialized by the write start signal RSTW. This video signal is read out in response to the read start signal RSTR and read clock RCK, which are generated on the basis of the fixed reference clock in the read controller 9, thereby providing a video output free from the time-axial error component. An error signal, generated by the error generator 10 on the basis of the write start signal RSTW and the read start signal RSTR, is supplied to the spindle driver 11 which performs the spindle servo to make the difference between the write and read addresses constant.

When it is intended to process an external video signal, such as a TV video signal, the switches SW1 and SW2 are set to the b side. The external video signal does not have any time-axial error component, and the write clock WCK and the write start signal RSTW are generated in phase synchronism with the video signal in the write controller 7. Since the external video signal is free from a time-axial error component, the write clock WCK has a constant frequency. The error signal generated by the error generator 10 is sent to the read controller 9 via the switch SW2 to control the crystal oscillator which normally oscillates at a constant frequency, to thereby set the frequency of the read clock RCK equal to that of the write clock WCK. As a result, the difference between the write and read addresses becomes constant to ensure the proper image reproduction of the external video signal. The external video signal may be a video signal free from a time-axial variation, output from the video disk player, or a video signal with a little time-axial error component, beside the TV video signal. With regard to the video signal with a little time-axial error component, the functions of the field memory 12 can be used after removing this error component via the line memory 8.

Although the description of the above embodiment has been given with reference to the case where the line memory 8 in use has a memory capacity corresponding to one line, the memory capacity is not limited to this size. Further, replacing the line memory 8 with a FIFO type field memory having a memory capacity corresponding to one field can eliminate the need for the field memory 12.

Although the difference between the write address and read address is detected on the basis of the write start signal RSTW and read start signal RSTR in the above embodiment, this invention is not restricted to this particular detection. Any other means may also be employed as long as it can detect such an address difference.

According to the video disk player embodying the present invention, as described above, a control signal according to the difference between the write and read addresses of a memory is generated, and at the time of processing a reproduction video signal, a read clock is generated on the basis of a fixed reference signal while the phase of a write clock is altered by spindle servo based on the control signal, keeping constant the difference between the write and read addresses. At the time of processing an external video signal, the read clock is phase-synchronized with the write clock based on the control signal, thus maintaining the difference between the write and read addresses constant. It is therefore possible to provide the proper image reproduction of an external video signal by using the memory, and ensure not only still picture reproduction using the memory but also utilization of a digital Y-C separating function and digital noise reducing function, if incorporated in the memory device, with respect to the external video signal. Further, a special effect function, if any, can also be enjoyed.

Since a single circuit is used to generate a control signal for spindle servo at the time of processing a reproduction video signal and a control signal for phase control of a read clock at the time of processing an external video signal, the circuit is simple in construction.

What is claimed is:

1. A video disk player having play means for rotating a video disk, reading a recorded video signal therefrom and demodulating the read video signal so as to produce a demodulated video signal; A/D converting means for converting the demodulated video signal into a digital video signal; a video memory; write/read control means for generating a read clock and a write clock, said write clock being synchronized to a sync signal include in said digital video signal, said write/read control means writing the digital video signal into the memory in synchronism with the write clock and reading digital data from the memory in synchronism with the read clock; D/A converting means for converting digital data read by the write/read control means from the video memory into an analog signal, and an error signal generating means for generating an error signal in accordance with a difference between write and read addresses specified by said write/read control means, the video disk player further comprising:

replacing and supplying means for supplying an external video signal in place of the demodulated video signal to the A/D converting means, said replacing and supplying means capable of being actuated in which case the external video signal is supplied to said A/D converting means and capable of being not actuated in which case the demodulated video signal is supplied to the A/D converting means; and selectively supplying means for supplying the error signal to said play means while the replacing and supplying means is not actuated and supplying the error signal to the write/read control means when the replacing and supplying means is actuated, said play means performing rotational servo control of the video disk on the basis of said error signal and the write/read control means generating the read clock on the basis of a fixed reference clock signal while the replacing and supplying means is not actuated, and while the replacing/supplying means is actuated, the write/read control means generates the read clock on the basis of the error signal.

2. A video disk player according to claim 1, wherein the replacing and supplying means and the selectively supplying means each comprise a switch.

3. A video disk player according to claim 1, wherein the video memory includes at least one line memory.

4. A video disk player according to claim 3, wherein the video memory has a field memory located at a subsequent stage of said line memory.

* * * * *